United States Patent [19]
Cmelik K.

[11] 3,816,811
[45] June 11, 1974

[54] FLUID MIXTURE ANALYZER USING A CAPACITIVE PROBE AND VOLTAGE DIVIDER

[76] Inventor: Rudolf Max Helmut Cmelik K., Maracaibo, Venezuela

[22] Filed: Jan. 12, 1973

[21] Appl. No.: 323,026

[52] U.S. Cl. ............................................. 324/61 R
[51] Int. Cl. .......................................... G01r 27/26
[58] Field of Search ............ 324/61 P, 61 R; 73/53, 73/61 R, 153, 194 E; 317/246

[56] References Cited
UNITED STATES PATENTS

| | | | |
|---|---|---|---|
| 2,350,832 | 6/1944 | Segesman | 324/61 P |
| 2,720,624 | 10/1955 | Gunst et al. | 324/61 P |
| 2,829,518 | 4/1958 | Rumble et al. | 73/194 E X |
| 2,848,710 | 8/1958 | Owen | 324/61 P |
| 2,868,012 | 1/1959 | Lebourg | 73/194 E X |
| 3,006,189 | 10/1961 | Warren et al. | 324/61 P |
| 3,226,635 | 12/1965 | Moe | 324/61 P |
| 3,264,558 | 8/1966 | Heeps | 324/61 P |
| 3,279,249 | 10/1966 | Tocanne | 324/61 P |
| 3,437,924 | 4/1969 | Tocanne | 324/61 P |
| 3,665,301 | 5/1972 | Maltby | 324/61 P |

Primary Examiner—Stanley T. Krawczewicz
Attorney, Agent, or Firm—Ladas, Parry, Von Gehr, Goldsmith & Deschamps

[57] ABSTRACT

A sensor device for ascertaining water content of a petroleum flow in a well-pipeline including a capacitive sensing head between the plates of which the petroleum flows and an electrical assembly to measure the dielectric constant of the petroleum flow between the plates and to provide an output representing said dielectric constant which is indicative of the water content of the petroleum.

9 Claims, 6 Drawing Figures

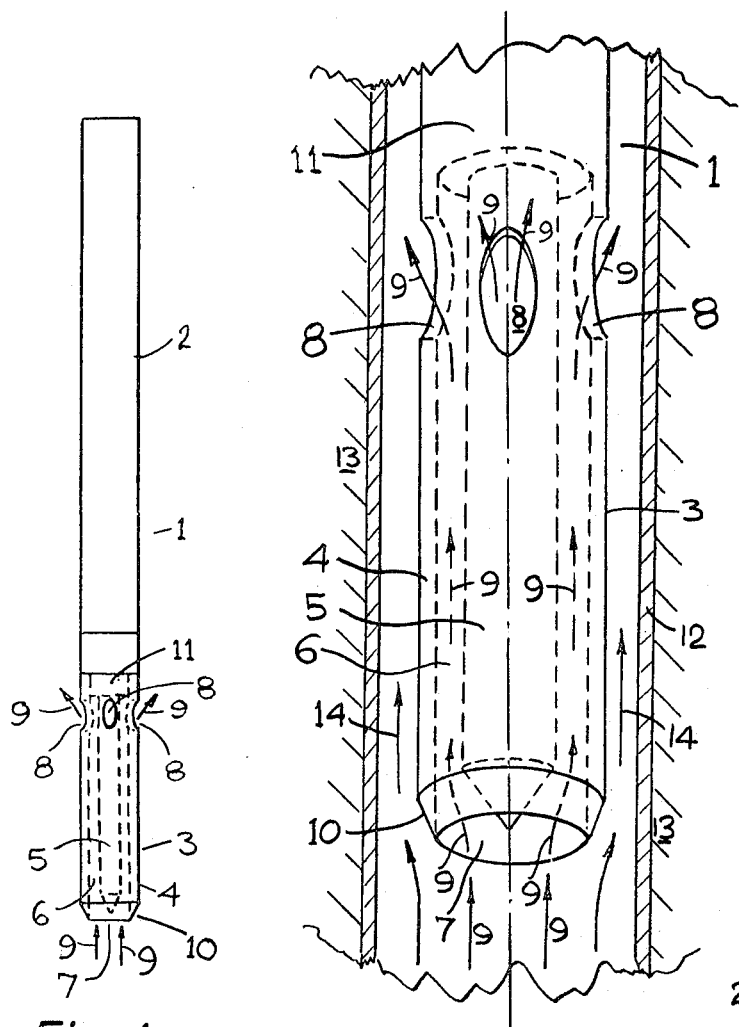
Fig. 1
Fig. 2
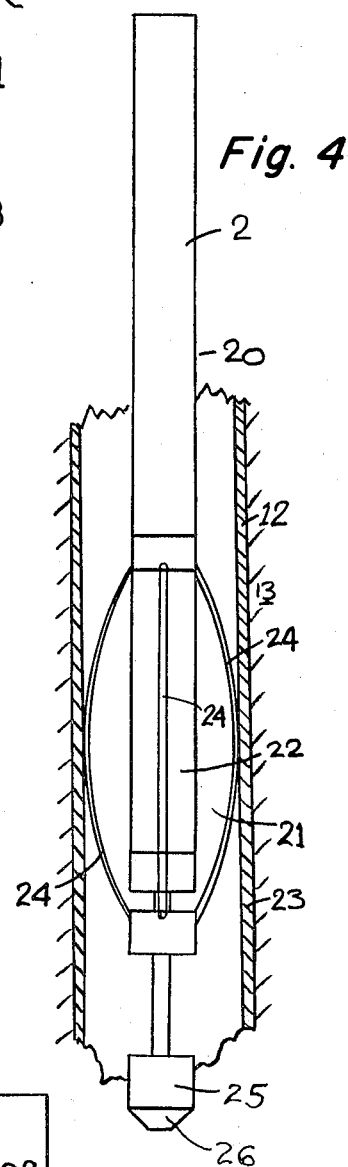
Fig. 4
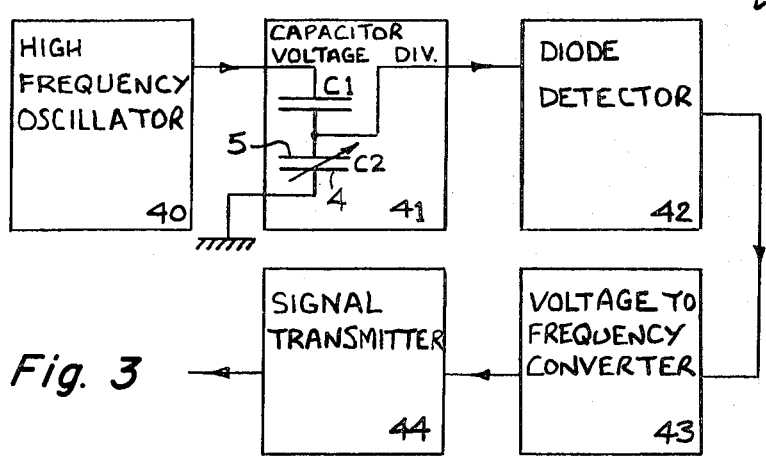
Fig. 3

FLUID MIXTURE ANALYZER USING A CAPACITIVE PROBE AND VOLTAGE DIVIDER

SUMMARY OF THE INVENTION

This invention relates to a sensor device and particularly, though not exclusively, to a sensor device able to sense the amount of water in petroleum well-pipeline and adapted for accommodation in such a well or pipeline.

In the extraction of petroleum there frequently appears, mixed therewith, water originating from subterranean currents or filtrations that occur when drilling in sea or lake beds and reaching the wells to produce an emulsified petroleum requiring subsequent separation by costly means.

To know the proportion of water contained in a certain petroleum extraction at the moment it occurs constitutes a basic requirement for preventing the accumulation of enormous quantities of emulsified petroleum which causes substantial increases in the cost of production.

An object of this invention is to provide for the petroleum industrialists an inexpensive, effective and accurate device that permits obtaining an accuracy superior to previously known devices in which, when the water contained in the petroleum reaches a level of 45 percent or more, the readings become erratic or inaccurate.

Another object of this invention is to provide a robust instrument which is substantially foolproof in operation.

According to one aspect of the invention there is provided a sensor device comprising a housing having an electrically insulative plate support, a pair of electrically conductive plates mounted to said support in fixed spaced electrically insulated relationship and adapted for the passage of a fluid, the dielectric constant of which is to be sensed, therebetween, and electrical means housed in said housing and electrically connected to said plates to measure said dielectric constant of said fluid between said plates and to provide an output signal representing said dielectric constant.

According to another aspect of the invention there is provided a sensor device for measuing water content of fluid in a petroleum well-pipeline having an electrically conductive well liner, comprising an elongate hermetically sealed cylindrical housing having an electrically insulative plate support, an electrically conductive elongate rod mounted to said support and extending coaxially with and from said housing, at least three resilient spacers electrically insulated from said rod and adapted to engage said liner to maintain said rod in substantially fixed spaced concentric relationship with said liner so that said liner and said rod define an annular space through which said fluid can flow, and electrical means housed in said housing and electrically connected to said rod and, by way of electrical ground, to said liner to measure the dielectric constant of fluid between said rod and said liner in said annular space and to provide an output signal representing said dielectric constant and consequently the water content of said fluid.

BRIEF DESCRIPTION OF DRAWINGS

FIG. 1 is an elevation of one embodiment of the sensor device,

FIG. 2 is a perspective view of the end portion of the sensor device shown in a petroleum well-pipeline, FIG. 3 is a block diagram of an electrical assembly housed in the sensor device, FIG. 4 is an elevation of a second embodiment of the sensor device shown in a petroleum well-pipeline.

DETAILED DESCRIPTION

Figure 5:
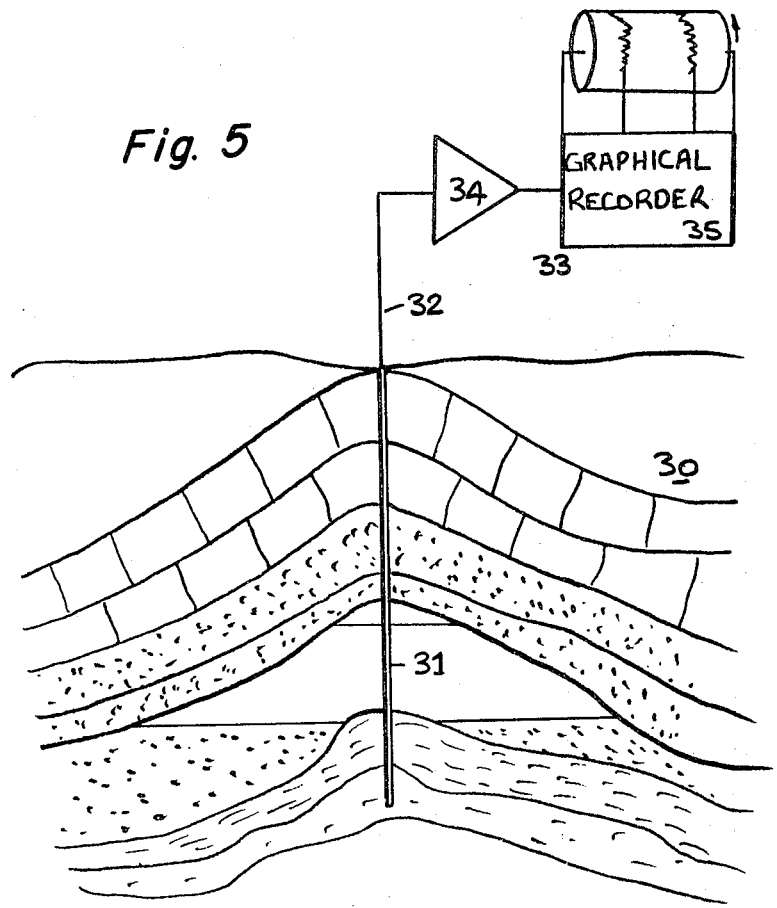
FIG. 5 is a sectional elevation of a petroleum well with a sensor device in the pipeline thereof and showing diagrammatically surface located components to receive and interpret the information transmitted by the sensor device.

In FIGS. 1 and 2, a sensor device 1 includes an electronics section housing 2 and a sensing head 3. The sensor device is of elongate cylindrical form with the electronics section housing 2 coaxially mounted and joined to the sensing head 3.

The electronics housing comprises a hermetically sealed outer casing in which is located the electrical components concerned with the operation of the sensor.

The sensing head comprises a pair of capacitor plates 4 and 5, plate 4 being a hollow cylindrical elongate plate which defines the outer surface of the sensing head and plate 5 being a central rod extending coaxially through the outer plate and defining with the outer plate an annular elongate space 6 separating the inner and outer plates.

The annular plate 4 defines an entry 7 at the end of the sensing head remote from the electronics section housing 2 and four peripheral fluid outlets 8 disposed around the circumference of the outer plate 5 adjacent the electronics section housing 2. FIGS. 1 and 2 show three of these openings only as the fourth opening is disposed behind the sensor device as seen in these drawings.

The annular space 6 extends from the entry 7 to the outlets 8 thereby to permit flow of fluid from the entry to the outlets as shown by arrows 9.

The end 10 of the outer plate 4 which defines the entry is tapered in order to minimize the resistance of the sensor device to flow of fluid into and passed the sensor device. The end of the inner plate 4 adjacent the entry 7 is of conical form, thereby to minimize the resistance of the interior of the sensing head to flow of fluid therethrough.

The outer plate 4 and inner plate 5 are maintained in spaced relationship by virtue of their mounting to a support 11 adjacent the electronics section housing 2, the support 11 providing electrical insulation between the plates.

FIG. 2 shows the sensor device in position in a petroleum well-pipeline as represented by a portion of the well liner 12 surrounded by the ground 13 through which the liner extends. The sensor device in this arrangement is for the purpose of ascertaining the water to oil ratio of fluid flowing along the pipeline with the arrows 9 representing the flow of this mixture through the sensor device and arrows 14 representing the flow of fluid bypassing the device. In this connection, it will be realized that in order to prevent undue restriction of flow along the pipeline the cross section of the sensor device should be materially smaller than the cross section of the pipeline in order that only a small proportion of the flow along the pipeline will be passed through the annular space 6 of the sensor device for measurement of the water to oil ratio.

FIG. 3 illustrates the general detail of the electronic components housed in the electronics section housing 2 in combination with electrical representation of the capacitor formed by the plates 4 and 5. These electronic components are supplied with power by way of a cable (not shown) which is connected to a source of electricity (also not shown). Although there follows a generalized description of the electronic arrangement, it will be appreciated that the electrical circuit arrangements of each item shown as a block in the block diagram of FIG. 3 are of a nature which is well within the scope of any skilled electrical engineer to provide.

Electricity from the source is fed to a high frequency oscillator 40 which produces a square wave output of 12 volts peak to peak at a frequency of 130 kHz. This signal is fed to a capacitor voltage divider 41 which includes the capacitor formed by the plates 4 and 5. The output of the voltage divider is fed to a diode detector which converts the alternating current signal to a direct current signal and feeds this direct current signal to a voltage to frequency converter 43 the output of which is an alternating current signal the frequency of which represents the magnitude of the direct current signal fed to the converter. The output from the voltage to frequency converter 43 is fed to a signal transmitter 44 which provides an output to be fed by way of a cable (not shown) to a receiving arrangement.

This high frequency oscillator 40 is of a type which will provide the desired frequency at a constant amplitude. Although the preferred form of this oscillator produces a square wave, it is possible to use oscillators producing other wave forms, for example, sine, saw tooth. The degree of frequency stability is not important and a suitable example of an appropriate oscillator is a free running multivibrator.

The capacitive voltage divider 41 comprises a constant capacitor C1 and a capacitor C2 formed by the inner and outer plates 4 and 5, the capacitance of which will vary with the dielectric constant of the fluid flowing through the annular space 6. Capacitors C1 and C2 are connected in series with the plate of capacitor C1 not common to the two capacitors being connected to the output of the high frequency oscillator 40 and the plate 4 of capacitor C2 connected to electrical ground. The output of the capacitor voltage divider 41 is taken from the connection between the capacitor C1 and C2. With a constant input voltage $V1$ and a constant capacitance $C1$, the output voltage is $V2 = V \cdot C1/C1 + C2$ and depends only on the capacitance of C2. To obtain good linearity and a complete operating range, the capacitors C1 and C2 may consist of networks of several capacitors in series and/or parallel.

The output from the capacitor voltage divider 41 is an alternating signal having a voltage V2 and the diode detector 42, which includes filter capacitors and resistors, rectifies this signal to produce a direct current signal the amplitude of which represents the alternating current voltage $V2$. The impedance of the diode detector and the input impedance of the following voltage to frequency converter 43 is sufficiently high to avoid loading of the capacitive voltage divider, the impedance of which depends on the frequency of the high frequency oscillator. The actual impedance required depends on the overall circuit characteristcs and will be readily apparent to any man skilled in the art when producing an example of this sensor device.

The direct current signal from the diode detector is passed to the voltage to frequency converter 43, which converter comprises a circuit having two parts, a control stage and a low frequency oscillator. The direct current signal first passes into the control stage which controls the frequency of the low frequency oscillator according to variations in that direct current signal. In an example of a suitable circuit arrangement, the voltage to frequency converter includes a unijunction transistor used in a relaxation oscillator at a basic frequency of approximately 5 kHz and the control stage consists of a transistor in common-collector connection, acting as a variable current drain on an emitter capacitor of the unijunction oscillator. With the control stage connected to receive the direct current signal, the frequency of the low frequency oscillator may be arranged to be of the order of 1 kHz with a dielectric constant, of material between the plates 4 and 5, equal to that of oil and 3 kHz with a dielectric constant, of material between the plates 4 and 5, equal to that of water (see FIG. 6).

The variable frequency alternating current output signal from the voltage to frequency converter 43 is fed to signal transmitter 44. The signal transmitter 44 amplifies the low frequency oscillator output and adjusts its impedance to render it suitable for transmission via a cable (not shown) for connection to any suitable readout or recording instrument, such as those shown diagrammatically in FIG. 5.

FIG. 4 shows an alternative embodiment in which a sensor device 20 includes an electronics section housing 2 and a sensing head 21. In this alternative embodiment, the capacitor plates are formed by an inner conductive circular rod 22 and the electrically conductive lining of a well-pipeline 23.

The inner plate 22 is coaxial with and joins the electronic housing 2 and the inner plate 22 together with the electronic housing 2 form an elongate cylinder of constant diameter in order that resistance to flow of fluid there by will be minimized. The inner plate 22 is electrically insulated from the electronic housing 2.

The sensor device 20 is centralized in the pipeline by resilient spacers 24. There are four of these spacers equally spaced about the circumference of the sensor device 20 and all of the spacers are electrically insulated from the inner plate 22. The spacers are of a bowed form and are of a size which will resiliently engage the inner surface of the pipeline in which the sensor device is to be used in order to center the sensor device in the pipeline thereby to produce a substantially annular space between the inner plate 22 and the pipeline 23 through which fluid the dielectric constant which is to be sensed will pass. The resilience of the spacers may be such that they are sufficiently deformable to permit the sensor device to be used in pipelines of differing diameters.

At the end of the inner plate remote from the electronic housing 2, there is provided a projecting head 25 with a frusto-conical end 26. This head 25 acts to stabilize flow of fluid the water content of which is to be measured past the sensor device and plays no direct part in the measurement of water content.

The electronic housing 2 shown in FIG. 4 contains electrical circuitry substantially the same as that described with reference to FIG. 3. This circuitry differs from that shown in FIG. 3 substantially only by the plate 4 being the pipeline which is, of course, electrically grounded.

In FIG. 5, there is illustrated a section through a petroleum-bearing stratum 30 through which extends an oil well-pipeline 31. A sensor device according to the present invention is in the pipeline and is connected to surface equipment by means of cable 32 having a plurality of electrical conductors through which electrical power is supplied to the sensor device and the signal indicating water content of oil in the pipeline is passed to the surface equipment. The surface equipment 33 includes an amplifier 34 and a graphical recorder 35.

Figure 6:
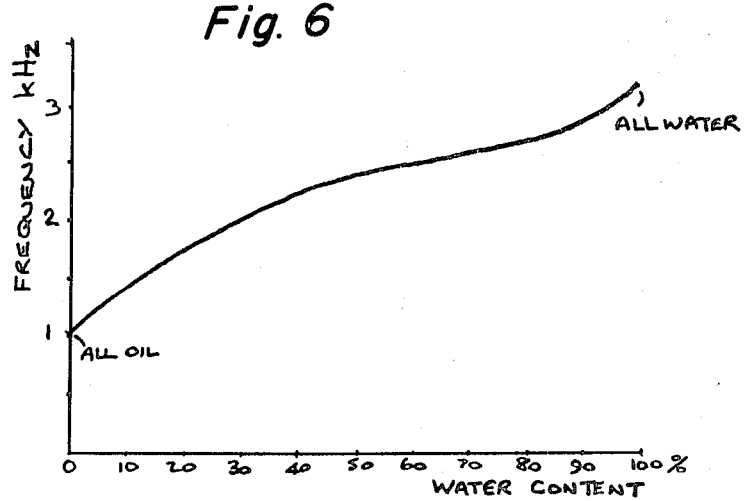
FIG. 6 is a graphical representation of the relationship between the frequency of the output of the sensor device and water content in a petroleum flow.

FIG. 6 shows graphically the relationship between the frequency of the alternating signal produced by a sensor device according to FIGS. 1, 2 and 3 and the water content of the oil and water mixture flowing through a pipeline. The graphical recorder 35 records on a chart 36 an indication of the frequency of the signal received by the recorder and the chart 36 may in specific installations be printed with calibrations indicating directly the water content of the oil and water mixture as represented by the signal received by the recorder.

It will be appreciated that although specific embodiments of the present invention have been described, variations of these embodiments which are obvious to men skilled in the art may be made without departing from the spirit and scope of the invention.

I claim:

1. A sensor device comprising a housing having an electrically insulative plate support, a pair of electrically conductive plates mounted to said support in fixed spaced electrically insulated relationship and adapted for the passage of a fluid, the dielectric constant of which is to be sensed, therebetween, and electrical means housed in said housing and electrically connected to said plates to measure said dielectric constant of said fluid between said plates and to provide an output signal representing said dielectric constant, said electrical means including a capacitor voltage divider, one of the capacitors of which is said pair of plates.

2. A sensor device according to claim 1 wherein said housing is in the form of an elongate hermetically sealed cylinder at one end of which is said support and in which the electrical means is housed, and said plates are mounted to extend coaxially with the longitudinal axis of the housing, one said plate being an elongate hollow cylindrical plate and the other said plate being an elongate rod mounted within the hollow center of said hollow plate and defining therewith an annular space longitudinally through which said fluid can flow.

3. A sensor device according to claim 2 wherein said housing and hollow plate together form an elongate cylindrical shape of substantially constant diameter adapted for use in a well-pipeline to measure the dielectric constant of fluid flowing through said pipeline.

4. A sensor device according to claim 3 wherein said hollow plate has a plurality of openings adjacent the housing to facilitate flow of said fluid from the end of the plates remote from said housing through said annular space.

5. A sensor device according to claim 4 wherein the ends of said plates remote from said housing are shaped to minimize the resistance of said device to flow of said fluid through the annular space and by the device.

6. A sensor device according to claim 1 wherein the electrical means comprise an oscillator, to generate an alternating electric current, said capacitor voltage divider, to receive the output from said oscillator, the capacitance of said pair of plates of which will vary with variation of the dielectric constant of said fluid between said plates to produce a divider output which is an alternating electric signal the amplitude of which represents said dielectric constant of said fluid, a diode detector to convert the alternating signal from said divider into a direct current electric signal the amplitude of which represents said dielectric constant of said fluid, a voltage to frequency converter arranged to generate an alternating current electric signal, in response to the direct current electric signal, the frequency of which represents said dielectric constant of said fluid and a signal transmitter arranged to adapt the signal from the converter for transmission to a remote receiving means.

7. A sensor device according to claim 6 wherein an electric cable connects the sensor device with the receiving means.

8. A sensor device for measuring water content of fluid in a petroleum well-pipeline having an electrically conductive well liner, comprising an elongate hermetically sealed cylindrical housing having an electrically insulative plate support, an electrically conductive elongate rod mounted to said support and extending coaxially with and from said housing, at least three resilient spacers electrically insulated from said rod and adapted to engage said liner to maintain said rod in substantially fixed spaced concentric relationship with said liner so that said liner and said rod define an annular space through which said fluid can flow, and electrical means housed in said housing and electrically connected to said rod and by, way of electrical ground, to said liner to measure the dielectric constant of fluid between said rod and said liner in said annular space and to provide an output signal representing said dielectric constant and consequently the water content of said fluid, said electrical means including a capacitor voltage divider, one of the capacitors of which is said rod and said liner.

9. A sensor device according to claim 8 wherein the electrical means comprises an oscillator, to generate an alternating electric current, said capacitor voltage divider, to receive the output from said oscillator, the capacitance of said rod and said liner of which will vary with variation of the dielectric constant of said fluid between said rod and said liner to produce a divider output which is an alternating electric signal the amplitude of which represents said dielectric constant of said fluid, a diode detector to convert the alternating signal from said divider into a direct current electric signal the amplitude of which represents said dielectric constant of said fluid, a voltage to frequency converter arranged to generate an alternating current electric signal in response to the direct current electrical signal the frequency of which represents said dielectric constant of said fluid and a signal transmitter arranged to adapt the signal from the converter for transmission to a remote receiving means.

* * * * *